Figures 7, 8:
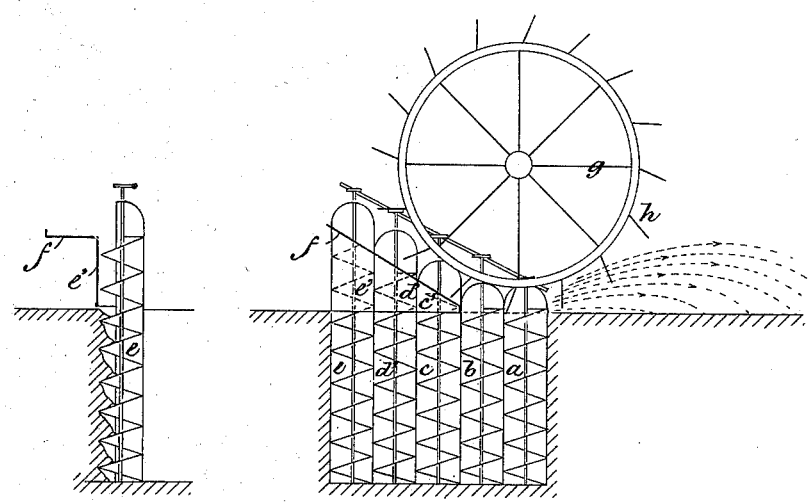

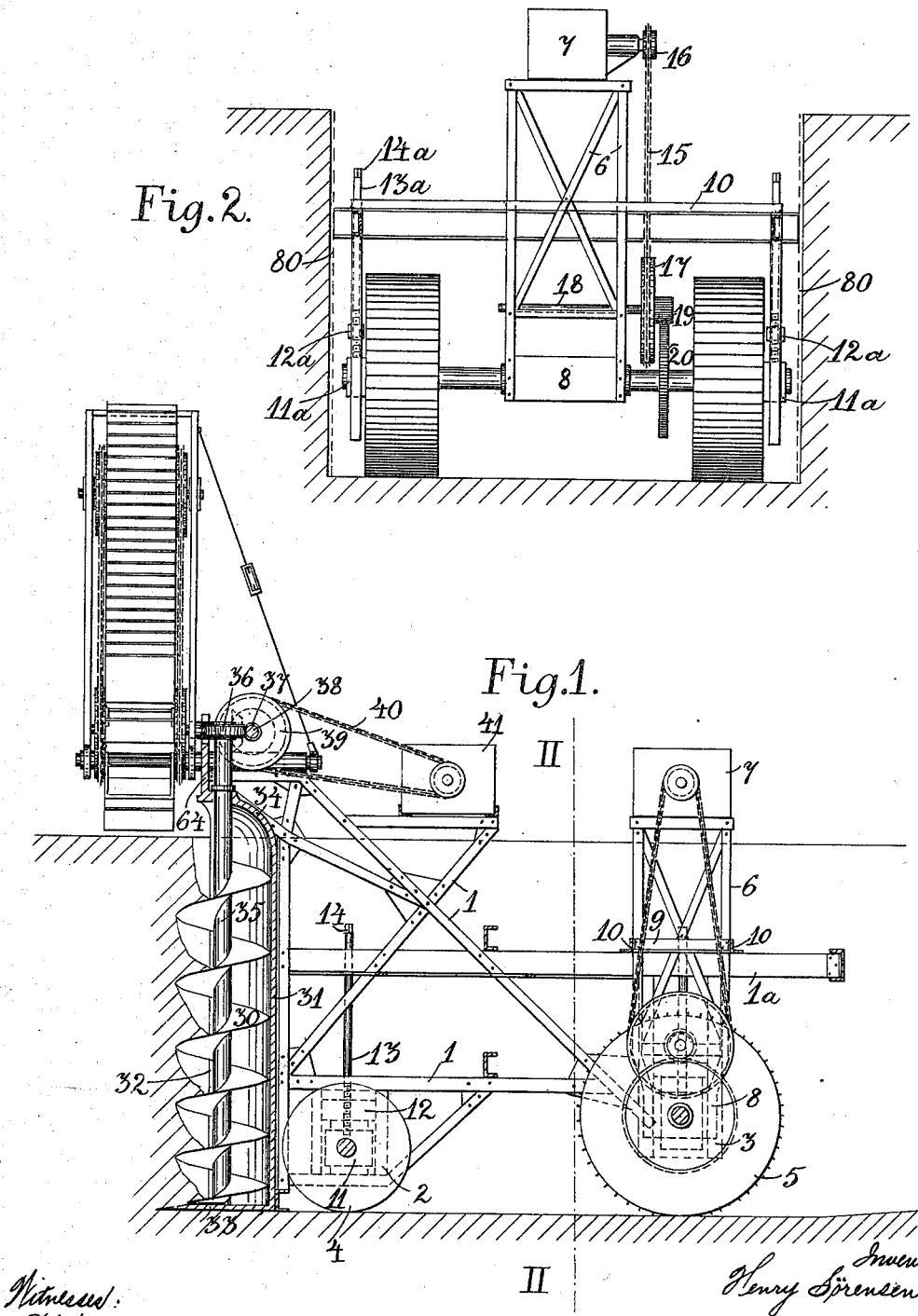

No. 734,766. PATENTED JULY 28, 1903.
H. SÖRENSEN.
DIGGING MACHINE.
APPLICATION FILED DEC. 29, 1902.
NO MODEL. 4 SHEETS—SHEET 2.
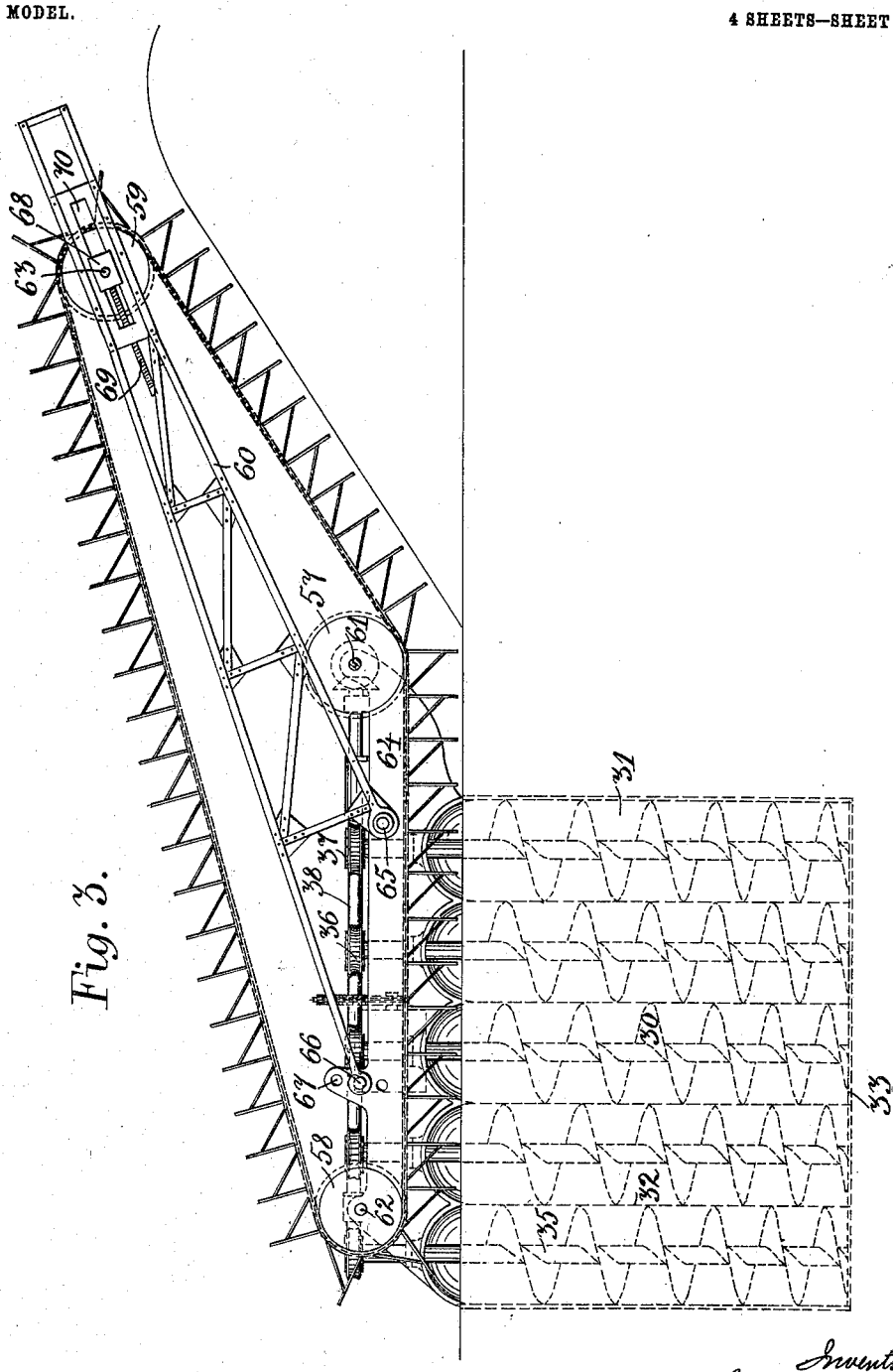

No. 734,766. PATENTED JULY 28, 1903.
H. SÖRENSEN.
DIGGING MACHINE.
APPLICATION FILED DEC. 29, 1902.
NO MODEL. 4 SHEETS—SHEET 3.
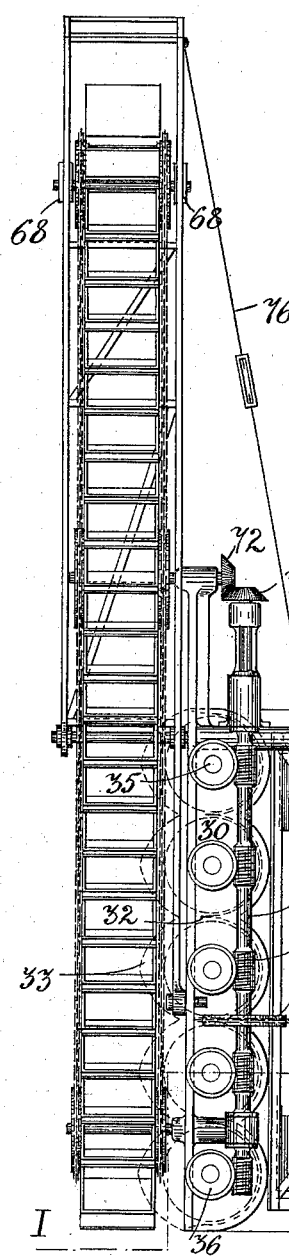
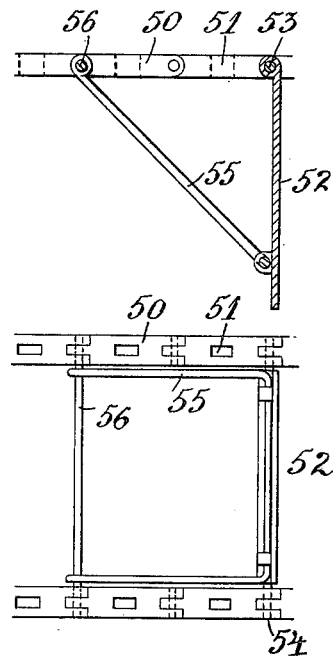
Fig. 5.
Fig. 6.
Fig. 4.
Witnesses: Inventor.
Henry Sörensen.
by Henry Orth
Atty.

No. 734,766. PATENTED JULY 28, 1903.
H. SÖRENSEN.
DIGGING MACHINE.
APPLICATION FILED DEC. 29, 1902.
NO MODEL. 4 SHEETS—SHEET 4.

Witnesses: Inventor:
Henry Sörensen
By Henry Orth & Son
Attys

No. 734,766. Patented July 28, 1903.

UNITED STATES PATENT OFFICE.

HENRY SÖRENSEN, OF CHRISTIANIA, NORWAY.

DIGGING-MACHINE.

SPECIFICATION forming part of Letters Patent No. 734,766, dated July 28, 1903.

Application filed December 29, 1902. Serial No. 137,022. (No model.)

*To all whom it may concern:*

Be it known that I, HENRY SÖRENSEN, a subject of the King of Sweden and Norway, residing at Christiania, Norway, have invented certain new and useful Improvements in Digging-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to excavators and machines for digging purposes, and more especially to machines for digging channels adapted for irrigation of arid land and for shipping purposes, &c. The object of my invention is to procure means whereby this work may be performed in any easy manner and with the least possible use of human and animal power. Apparatus according to this invention may also be constructed for the purpose of cutting ways in snow on railroad-lines.

My invention consists, broadly, in the combination, with a row of digging-screws, of means for supporting the same and feeding them forward, said means consisting of a carriage adapted to run on a level with the lowermost point of the screws—that is to say, on the bottom of the channel dug out by the screws. In the preferred form of carrying out my invention these digging-screws are arranged so as to only work the material up to the surface, where it is taken hold of by an apparatus adapted to simply push it sidewise. I prefer this arrangement because when the material is, as in other digging apparatus and excavators, taken considerably above the surface before it is moved off sidewise an unnecessary work is performed in lifting the material higher than it is to remain. I prefer also to construct my apparatus so that it is capable of working itself down into the ground, working out a slope from the surface down to the depth which fixes the bottom of the channel, on which slope the carriage of the machine runs down.

I am aware of the existence of apparatus for digging purposes the construction of which is based on the use of a screw as a means for loosening the material and lifting it up. My invention, however, is based on the use of a series of screws placed close aside of each other. When using a single screw, it is not possible to dig out channels of any considerable width, because the diameter of the screw cannot be increased beyond limited measure without materially diminishing the efficiency of the machine. In employing a row of relatively narrow screws and mounting them as above described I am enabled to dig out channels of any width within the limits of practical wants.

Figure 9:
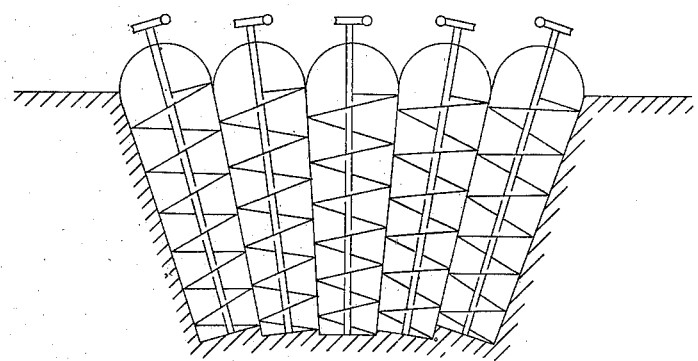

In the drawings, Figure 1 is a vertical longitudinal section of my improved digging apparatus, taken about on the line I I, Fig. 4. Fig. 2 is a vertical cross-section looking to the right, taken about on the line II II, Fig. 1. Fig. 3 is a front elevation of the machine, showing a part of it below ground in dotted lines. Fig. 4 is a plan view of the entire machine. Figs. 5 and 6 are details of the conveyer, being a vertical section and bottom view, respectively, of a portion of the same. Figs. 7, 8, and 9 illustrate two modified arrangements of the digging-screws.

The main frame 1 of the machine may be constructed of rolled iron of suitable section. It has a rearwardly-projecting part $1^a$ and downwardly-projecting guides 2 and 3 for the journal-boxes of the front wheels 4 and the rear wheels 5. The front wheels carry the substantial weight of the machine, the rear wheels 5—the driving-wheels—carrying chiefly only the auxiliary frame 6, on which the motor 7 for driving the machine is mounted. This latter frame is a substantially vertical structure rising from a block 8, which is carried by the central part of the axle of the driving-wheels. This auxiliary frame passes through an opening in the rearward extension $1^a$ of the main frame, said opening being formed by longitudinal and lateral braces 9 and 10, which form a guide for the auxiliary frame, allowing of a vertical adjustment of the same, together with the wheels. For the purpose of vertically adjusting the front as well as the rear wheels the axle-boxes 11 and $11^a$ of the same are allowed a certain vertical play in their guides. Above each box is placed a block 12 $12^a$, having a central screw-threaded hole through which passes a screw-rod 13 $13^a$, which at the top has a square portion 14 $14^a$. It will be seen that the boxes rest against the lower end of these screws, and by turning the screws the boxes, and therewith the frame, are vertically adjusted for the purpose of leveling the machine sidewise or partly for raising or lowering the digging-screws 30 and the horizontal cutters 33.

The transmission of power from the motor 7 to the axle of the driving-wheels 5 may be performed in any suitable way—for instance, by way of belt or chain 15 between the driving-pulley 16 of the motor and a wheel 17 on an intermediate shaft 18, the latter shaft having a pinion 19 meshing with a tooth-wheel 20 on the driving-axle, as clearly shown in Fig. 2. I have shown and described this driving mechanism as driving the axle on which the driving-wheels are mounted, but it will be understood that each driving-wheel may have its own driving mechanism, so that I am enabled to drive one independent of the other for the purpose of swinging the machine and working in curves.

At the forward end of the frame is a row of screws 30, preferably of the well-known form of digging-screws, having a gradually-increasing pitch. These screws are mounted side by side inside of feed-chutes 31, which are open in front and form a pointed vertical ridge 32 between each screw. At the bottom the feed-chutes are provided with a horizontal cutting-blade 33, and at the top the feed-chutes terminate in a hood-shaped top 34, serving to deflect the material, so it is deposited on the ground just in front of the machine.

The screw-shafts 35 are journaled in the bottom plate 33 and in the hood 34, projecting through the latter and carrying at the top a worm-wheel 36, meshing with worms 37 on a horizontal shaft 38, which through suitable gearing—for instance, sprocket-wheels 39 and chain 40—receives motion from the motor 41.

I have described and shown screws terminating at or somewhat below the ground and depositing the material on the ground in front of the machine, from where it may be removed by suitable machinery. I prefer this arrangement because in this manner the material is not to any part lifted higher than it is to be left on the ground. I may, however, without differing principally from my invention provide the screws or some of them with extensions above ground wholly incased by feed-chutes, so as to lift the material or part of it above the level of the ground for the purpose of facilitating the lateral removement of the material.

In the form of carrying out the invention shown in the drawings the removing of the material sidewise is performed by means of an endless belt provided with downwardly-projecting blades. This endless belt is preferably given a rapid motion, and the blades will thereby engage the material and throw it sidewise, where it will be deposited, forming a broad heap, as indicated in Fig. 3. The construction of this conveyer may be as follows, reference being especially had to Fig. 3 and Figs. 4, 5, and 6: It is formed of two parallel chains, the links 50 of which are provided with holes 51 for the teeth of sprocket-wheels. Between these chains are provided blades 52, which are secured to shafts 53, the terminals 54 of which are fitted into a set of chain-link holes, as shown. The blades are provided with a foot or brace 55, having pins 56 inserted into holes in the links. The chains run over three pairs of sprocket-wheels, of which 57 and 58 are mounted on shafts 61 and 62, journaled in the frame-head 64, while the third wheel pair 59 is mounted on a shaft 63, carried by a laterally-projecting arm or frame 60. This frame is secured to the frame-head 64 by means of bolts 65 and 66. To enable an adjustment of this arm to a somewhat more or less raised or lowered position, the latter bolt 66 can be inserted into one or other of a row of bolt-holes 67, as clearly shown in Fig. 3. The arm may then be swung on the bolt 65 as a center. The shaft 63 is mounted in journal-boxes 68, which by means of screws 69 may be adjusted in guides 70 at the end of the arm, whereby the chains may be slackened or tightened up. The arm 60 may be braced by one or more trusses 76, as indicated in Figs. 1 and 4.

The conveyer is driven from the shaft 38 by way of gear-wheels 71 and 72 on the shafts 38 and 61, respectively.

When very broad channels are to be dug out, I place two machines side by side, the one having a left-hand and the other a right-hand side conveyer. Then two machines coupled together will work their way in the ground as one machine, depositing the material on both sides of the channel.

The machine is provided with a housing 80, incasing the sides of the machinery.

I have above described means whereby the wheels of the machine may be adjusted vertically. This arrangement may be used for the purpose of bringing the machine from the level of the land down to the depth in which it is to work. For this purpose I before starting the machine adjust the front wheels, so as to bring the cutter 33 some inches down into the ground, a transverse groove being dug just in front of the machine. When the machine is started, I by and by as it cuts its way into the ground adjust the rear wheels, so that the rear of the machine is gradually lifted. By this manipulation the cutter 33 will be pressed downwardly as it works forward, and a slope is thereby formed. When the machine has worked its way so far that the front wheels commence to travel on this slope, the machine will without further regulation of the wheels cut a sloping way down into the ground, and when it has reached, say, half-way down to the desired depth I gradually adjust the wheels in the opposite direction, as before mentioned, whereby the pitch of the slope formed will gradually be lessened, and finally a horizontal surface will be formed. When the end of a channel is reached, I let my machine work its way up from the ground in a similar way, the adjustment of the wheels being performed in the opposite way.

The turning of the screw-rods 13 13ᵃ may be done by means of keys placed on the squares at the top of the screws, or I may put hand-wheels on these squares, or a suitable gearing as commonly used for such purposes may be connected with the screw-rods, so they may be turned simultaneously on both sides of the machine.

I have mentioned above that the screws may all, or some of them, be extended above the ground for facilitating the lateral removement of the material. In Figs. 7 and 8 I have shown a diagram of an arrangement of this kind by which I am enabled to make use of a wheel instead of a chain conveyer for the lateral removal of the material. Fig. 7 is a front view of such arrangement, and Fig. 8 is a vertical section through one of the chutes. In this manner of carrying out the invention two of the screws, a and b, are arranged, as before described, so as to deposit the material on the ground in front of the machine, while the remaining three screws, c, d, and e, are extended upwardly, c just a little, d somewhat more, and e still more above the ground. These screws are above the ground wholly incased by feed-chutes c' d' e', and where this casing ends an inclined apron f is placed, on which the material is deposited and on which it slides down laterally.

g is a large wheel provided with blades h. This wheel takes the place of the conveyer before described, and its shaft may be rotated in just the same manner as the shaft 61 of the conveyer. This wheel when rotating with a suitable speed will throw the material sidewise, as indicated.

When in the foregoing speaking about "digging-screws," I mean, as already mentioned, preferably the well-known screws with increasing pitch. The advantage of this kind of screws is due to the fact that they allow of an increasing volume of material from the bottom to the top, thereby materially increasing the efficiency of the screw and preventing the choking up of the chutes. A similar result may, however, be attained by making use of conical screws, which when employed in my machine may be arranged as indicated in Fig. 9, showing a row of such screws. When combining this system with the system of increasing pitch, a very efficient apparatus is obtained, so much the more as the channel is dug out, so it receives inclined sides.

I claim—

1. In an excavator, a supporting and driving mechanism having a cutting and lifting mechanism mounted at its forward end in fixed relation thereto, and a conveyer in front of said cutters adapted to remove the material in a lateral direction, substantially as described.

2. In an excavator, a cutting and lifting mechanism mounted at the front of the machine, and a conveyer mounted above and in front of said cutting and lifting mechanism and adapted to move at right angle to the path of travel of the machine, substantially as described.

3. In an excavator, a cutting and lifting mechanism mounted at the front of the machine, a conveyer mounted in front of and above the cutters and adapted to move at right angle to the path of the machine in a horizontal plane in front of the cutters and in an inclined plane at the side thereof, for the purpose specified.

4. In an excavator, a triangular endless conveyer supported on and operated by the driving mechanism, said conveyer adapted to travel in a horizontal plane in front of the excavator and in an inclined plane to the side of the excavator, substantially as and for the purpose specified.

5. In an excavator, the combination with a row of cutting and conveyer screws, a horizontal cutter below said screws, mechanism for rotating the screws, of a frame supporting said screws at its forward end so as to hold the lower end of the screws on a level with its plane of travel, substantially as described.

6. In an excavator, the combination with a row of vertical cutting and conveyer screws, a horizontal cutter at the lower end of each screw, a vertical feed-chute at the back of each screw, means for rotating the screws, of a frame supporting said screws at its forward end so as to hold the lower end of the screws on a level with its plane of travel, substantially as described.

7. In an excavator, the combination with a row of vertical cutting and conveyer screws, a horizontal cutter below said screws, a vertical feed-chute at the back of each screw, means for deflecting the material in a forward direction at the top of each screw, of a frame supporting said screws at its forward end so as to hold the lower end of the screws on a level with its plane of travel, and means for moving said carriage, substantially as described.

8. In an excavator, the combination with a battery of cutting-screws, a frame for supporting the screws at its forward end so as to hold the bottom end of the screws on a level with the plane of travel of said frame, means for rotating the screws, means for advancing the frame, of means for removing the material laterally in front of the carriage, substantially as described.

9. The combination with the frame of an excavating-machine, front wheels for supporting the frame, rear wheels for supporting and driving it forward, a motor for the driving-wheels, of means for adjusting the front and rear wheels vertically and independently of each other relatively to the cutting-tools of the machine, substantially as described.

10. The combination with the frame and the front wheels of an excavating-machine, rear driving-wheels and a motor for the same, of a vertically-adjustable frame for supporting said motor on the driving-wheels, and means for adjusting the two frames vertically in relation to each other, substantially as described.

11. In an excavating-machine, the combination with a row of cutting and conveyer screws, a frame supporting said screws at its forward end so that their lower ends will be on a level with the plane of travel of said frame, means for rotating the screws, means for deflecting the material forwardly to deposit it in front of the screws, a conveyer adapted to move the deposited material in a lateral direction, said conveyer having a horizontal portion and an inclined portion, substantially as described.

12. In an excavating-machine, the combination with a row of cutting and conveyer screws, a frame supporting said screws at its forward end so that their lower ends will be on a level with the plane of travel of said frame, means for rotating the screws, means for deflecting the material forwardly to deposit it in front of the screws, a conveyer adapted to move the deposited material in a lateral direction, said conveyer having a horizontal portion in front of the machine and an inclined portion at one side thereof, substantially as described.

13. In an excavating-machine, a battery of cutting and conveying screws having their lower ends in a horizontal plane and their upper ends in different planes, means for rotating said screws, means for advancing the screws and means for removing the material laterally.

14. In an excavating-machine, the combination with a main frame, supporting and driving wheels adjustably mounted therein, a motor for operating said driving-wheels, of feed-chutes mounted on the front of the frame, a horizontal cutter secured to the bottom of said chutes on a level with the plane of travel of said wheels, cutting and conveyer screws mounted in said chutes, a shaft adapted to rotate said screws, and a conveyer operated by said shaft, substantially as and for the purpose specified.

15. In an excavating-machine, the combition with a main frame, means for supporting and driving the same, of open feed-chutes mounted on the front of the frame, a horizontal cutting-blade secured to the bottom of the chute, deflecting-hoods formed on the top of said chutes, cutting and conveyer screws journaled in said hoods and blades, a conveyer mounted near the tops of said screws, a shaft for operating said screws and conveyer and means for rotating said shaft.

16. In an excavating-machine, the combination with the main frame, supporting and driving wheels adjustably mounted thereon, a motor mounted on the frame for operating the driving-wheels, of a plurality of vertical feed-chutes mounted on the front of the frame provided with deflecting-hoods at their tops and horizontal cutting-blades at their bottoms, cutting and conveyer screws mounted in said chutes, a frame mounted above the hoods, a conveyer mounted on said latter frame, a shaft for rotating the screws and means operated by said shaft for moving the conveyer laterally to the direction of travel of the main frame, substantially as described.

In witness whereof I have hereunto set my hand in presence of two witnesses.

HENRY SÖRENSEN.

Witnesses:
ALFRED J. BRYN,
AUG. OLSEN.